United States Patent
Li et al.

(10) Patent No.: US 11,349,649 B2
(45) Date of Patent: May 31, 2022

(54) METHODS AND SYSTEMS FOR MODIFYING BLOCKCHAIN NETWORK CONFIGURATION

(71) Applicant: Advanced New Technologies Co., Ltd., Grand Cayman (KY)

(72) Inventors: Yanpeng Li, Hangzhou (CN); Zhiyuan Feng, Hangzhou (CN); Long Cheng, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/242,697

(22) Filed: Apr. 28, 2021

(65) Prior Publication Data
US 2021/0250169 A1 Aug. 12, 2021

Related U.S. Application Data

(63) Continuation of application No. PCT/CN2020/073849, filed on Jan. 22, 2020.

(30) Foreign Application Priority Data

Mar. 8, 2019 (CN) .......................... 201910176960.6

(51) Int. Cl.
*H04L 9/40* (2022.01)
*H04L 9/08* (2006.01)
(Continued)

(52) U.S. Cl.
CPC .......... *H04L 9/0866* (2013.01); *H04L 9/0643* (2013.01); *H04L 9/3247* (2013.01); *H04L 2209/38* (2013.01)

(58) Field of Classification Search
CPC ... H04L 9/0866; H04L 9/0643; H04L 9/3247; H04L 2209/38
See application file for complete search history.

(56) References Cited

U.S. PATENT DOCUMENTS 11,044,156 B2 * 6/2021 Saltsgaver .......... H04L 41/0856
2016/0330034 A1 11/2016 Back et al.
(Continued)

FOREIGN PATENT DOCUMENTS

CN 106796688 5/2017
CN 107911373 4/2018
(Continued)

OTHER PUBLICATIONS

I. D. Alvarenga, G. A. F. Rebello and O. C. M. B. Duarte, "Securing configuration management and migration of virtual network functions using blockchain," NOMS 2018—2018 IEEE/IFIP Network Operations and Management Symposium, 2018, pp. 1-9, doi: 10.1109/NOMS.2018.8406249. (Year: 2018).*
(Continued)

*Primary Examiner* — Joseph P Hirl
*Assistant Examiner* — Ka Shan Choy
(74) *Attorney, Agent, or Firm* — Fish & Richardson P.C.

(57) ABSTRACT

A computer-implemented method for blockchain network configuration modification, includes obtaining, by a management client device, modification operation information, where the management client device is a blockchain client device of a blockchain network on which an administrator account is logged in as a logged-in administrator account, and where a user account of the blockchain network comprises at least one administrator account. The management client device constructs a configuration modification transaction including the modification operation information. The configuration modification transaction is signed using the logged-in administrator account. The signed configuration modification transaction is submitted to the blockchain network. After performing signature verification on the configuration modification transaction, each node in the blockchain network modifies, based on the modification
(Continued)

operation information comprised in the configuration modification transaction, blockchain network configuration information stored in the node and the configuration modification transaction is written into the blockchain network.

17 Claims, 16 Drawing Sheets

(51) Int. Cl.
*H04L 9/06* (2006.01)
*H04L 9/32* (2006.01)

(56) References Cited

U.S. PATENT DOCUMENTS

| | | | |
|---|---|---|---|
| 2017/0330174 A1 | 11/2017 | Demarinis et al. | |
| 2018/0039667 A1* | 2/2018 | Pierce | G06Q 40/04 |
| 2019/0311125 A1* | 10/2019 | Mulgaonkar | G06F 9/4406 |
| 2019/0325522 A1* | 10/2019 | Bathia | G06K 9/00624 |
| 2019/0333059 A1* | 10/2019 | Fallah | G06F 16/1834 |
| 2020/0042982 A1* | 2/2020 | Snow | H04L 9/0643 |
| 2020/0228342 A1* | 7/2020 | Nixon | G06F 21/64 |

FOREIGN PATENT DOCUMENTS

| | | |
|---|---|---|
| CN | 108125820 | 6/2018 |
| CN | 108683539 | 10/2018 |
| CN | 108810157 | 11/2018 |
| CN | 109408486 | 3/2019 |
| CN | 110011978 | 7/2019 |
| WO | WO 2017079214 | 5/2017 |
| WO | WO 2017204895 | 11/2017 |
| WO | WO 2018073482 | 4/2018 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Application No. PCT/CN2020/073849, dated Mar. 30, 2020, 9 pages (with partial English translation).

EP Extended Search Report in European Application No. 20770492. 5, dated Nov. 5, 2021, 9 pages.

* cited by examiner

FIG. 2E

| Parameter name | Notes | Value | Operation |
|---|---|---|---|
| consensus.pbft.viewchange_timeout_max_interval | The pbft protocol attempts to switch the maximum timeout interval. | 30001ms | Configuration modification |
| consensus.honeybadger.threads | honeybadger consensus algorithm-specific configuration: The quantity of threades for processing proposals, which is recommended not exceed the quantity of nodes and the quantity of CPU cores | 4 | Configuration modification |

> Chain configuration

| Parameter name | Notes | Value | Operation |
|---|---|---|---|
| chain.gaslimit | The upper limit of gas executed in a single transaction of the system | 10000000000 | Configuration modification |
| chain.gasprice | The conversion ratio of gas to balance in the system, that is, how many balances can be converted from one gas, balance = gasprice* gas | 0 | Configuration modification |
| chain.recycleid | Gas recovery account ID based on a hexadecimal identifier | 0x4a501e12785... | Configuration modification |
| chain.null_tx_block_period | Time interval between empty blocks in the system (Remarks: The interval must be smaller than the value set in consensus. Propose timeout interval) | 3000ms | Configuration modification |
| chain.consensus_period | When there is less than one batch of transactions in the system, wait for the time of initiating consensus. | 500ms | Configuration modification |
| chain.max_propose_bytes | Maximum byte limit of a consensus proposal | 4000000 byte | Configuration modification |
| chain.concurrent_execution | Switch for opening and executing a transaction | false | Configuration modification |

FIG. 2I

➤ Nonce nonconfiguration

| Parameter name | Notes | Value | Operation |
|---|---|---|---|
| nonce.before | Forward moving range of the window in the TimeNonce, in milliseconds | 3600000ms | Configuration modification |
| nonce.after | Backward moving range of the window in the TimeNonce, in milliseconds | 1800000ms | Configuration modification |

➤ P2P network layer configuration

| Parameter name | Notes | Value | Operation |
|---|---|---|---|
| p2p.protocol | Protocol type of the P2P network layer | ssl | Configuration modification |
| p2p.codec | P2P protocol layer codec mode | rlp | Configuration modification |

➤ Database configuration

| Parameter name | Notes | Value | Operation |
|---|---|---|---|
| storage.type | Data storage engine type | rocksdb | Configuration modification |

FIG. 2J

| Parameter name | Notes | Value | Operation |
|---|---|---|---|
| tx.payload.limit | Maximum byte limit of transaction payload | 1000000 bytes | Configuration modification |

∨ Account configuration

| Parameter name | Notes | Value | Operation |
|---|---|---|---|
| account.recover_duration | The account is recovering and the transaction of reset_pub_key cannot be sent within duration | 100 | Configuration modification |

∨ Contract configuration

| Parameter name | Notes | Value | Operation |
|---|---|---|---|
| contract.native.enable | Whether to allow the native contract | true | Configuration modification |

∨ Other configuration

| Parameter name | Notes | Value | Operation |
|---|---|---|---|
| crypto.suite | Unknown type configuration | classic | Unknown configuration |

FIG. 2K

METHODS AND SYSTEMS FOR MODIFYING BLOCKCHAIN NETWORK CONFIGURATION

CROSS-REFERENCE TO RELATED APPLICATIONS

This application is a continuation of PCT Application No. PCT/CN2020/073849, filed on Jan. 22, 2020, which claims priority to Chinese Patent Application No. 201910176960.6, filed on Mar. 8, 2019, and each application is hereby incorporated by reference in its entirety.

TECHNICAL FIELD

Embodiments of the present specification relate to the field of information technologies, and in particular, to methods and systems for modifying a blockchain network configuration.

BACKGROUND

With the popularization of blockchain technologies, service patterns based on a blockchain network (especially a consortium blockchain network) are increasingly common. Generally, operation and maintenance personnel of the blockchain network modify blockchain network configurations from time to time to satisfy changing service needs. The blockchain network configuration information can include network running parameters, node information, smart contract information, user account information, etc. of the blockchain network.

Specifically, the operation and maintenance personnel would modify configuration information stored in each node in the blockchain network one by one. After the same modification is made to the configuration information stored in each node, configuration modification to the entire blockchain network is completed.

However, this method for modifying a blockchain network configuration is inefficient.

SUMMARY

To improve efficiency of modifying a blockchain network configuration, embodiments of the present specification provide methods and systems for modifying a blockchain network configuration. Technical solutions are as follows:

According to a first aspect of the embodiments of the present specification, a method for modifying a blockchain network configuration is provided, where a user account of a blockchain network includes at least one administrator account, and the method includes the following:

A management client device obtains modification operation information, where the management client device is a blockchain client device on which the administrator account is logged in; the management client device constructs a configuration modification transaction including the modification operation information, and signs the configuration modification transaction by using the logged-in administrator account; the management client device submits the signed configuration modification transaction to the blockchain network; and after performing signature verification on the configuration modification transaction, each node in the blockchain network modifies, based on the modification operation information included in the configuration modification transaction, blockchain network configuration information stored in the node, and writes the configuration modification transaction into the blockchain.

According to a second aspect of the embodiments of the present specification, a blockchain system is provided, including at least one blockchain client device and a blockchain network, where a user account of the blockchain network includes at least one administrator account, and the management client device is a blockchain client device that an administrator account is logged in; the management client device obtains modification operation information; constructs a configuration modification transaction including the modification operation information, and signs the configuration modification transaction by using a key of the logged-in administrator account; and submits the configuration modification transaction to the blockchain network; and after performing signature verification on the configuration modification transaction, each node in the blockchain network modifies, based on the modification operation information included in the configuration modification transaction, blockchain network configuration information stored in the node, and writes the configuration modification transaction into the blockchain.

According to the technical solutions provided in the embodiments of the present specification, an administrator account with a configuration modification permission initiates a configuration modification transaction including modification operation information, and each node in a blockchain network automatically modifies blockchain network configuration information stored in the node by executing the configuration modification transaction. By using the embodiments of the present specification, the following technical effects can be implemented:

1. Operation and maintenance personnel do not need to modify configuration information stored on each node one by one. Instead, the each node automatically modifies the stored configuration information, improving working efficiency.

2. An inconsistent modification, which is made by operation and maintenance personnel, of the configuration information stored on each node can be prevented. In the embodiments of the present specification, after receiving a configuration modification transaction, a node automatically modifies the configuration based on the same modification operation information. Therefore, configuration modification to each node is consistent.

It should be understood that the previous general description and the following detailed description are merely examples and illustrative, and cannot limit the embodiments of the present specification.

In addition, any one of the embodiments in the present specification does not need to achieve all the previous effects.

BRIEF DESCRIPTION OF DRAWINGS

To describe the technical solutions in the embodiments of the present specification or in the existing technology more clearly, the following briefly describes the accompanying drawings needed for describing the embodiments or the existing technology. Clearly, the accompanying drawings in the following description merely show some embodiments of the present specification, and a person of ordinary skill in the art can still derive other drawings from these accompanying drawings.

DESCRIPTION OF EMBODIMENTS

A core idea of the present disclosure is that modification to configuration information stored in each node in a blockchain network is made by each node itself. As such, working efficiency can be improved, and a configuration modification operation of each node can be ensured to be consistent. Specifically, modification operation information used to modify configuration information is encapsulated into a blockchain transaction, and the blockchain transaction encapsulated with the modification operation information is submitted to the blockchain network by using an existing transaction execution mechanism of the blockchain network. A process in which each node in the blockchain network performs the blockchain transaction is a process of modifying configuration information stored in the node.

To make a person skilled in the art better understand the technical solutions in the embodiments of the present specification, the following describes in detail the technical solutions in the embodiments of the present specification with reference to the accompanying drawings in the embodiments of the present specification. Clearly, the described embodiments are merely some but not all of the embodiments of the present specification. All other embodiments obtained by a person of ordinary skill in the art based on the embodiments of the present specification shall fall within the protection scope of the present specification.

The technical solutions provided in the embodiments of the present specification are described in detail below with reference to the accompanying drawings.

Figure 1:
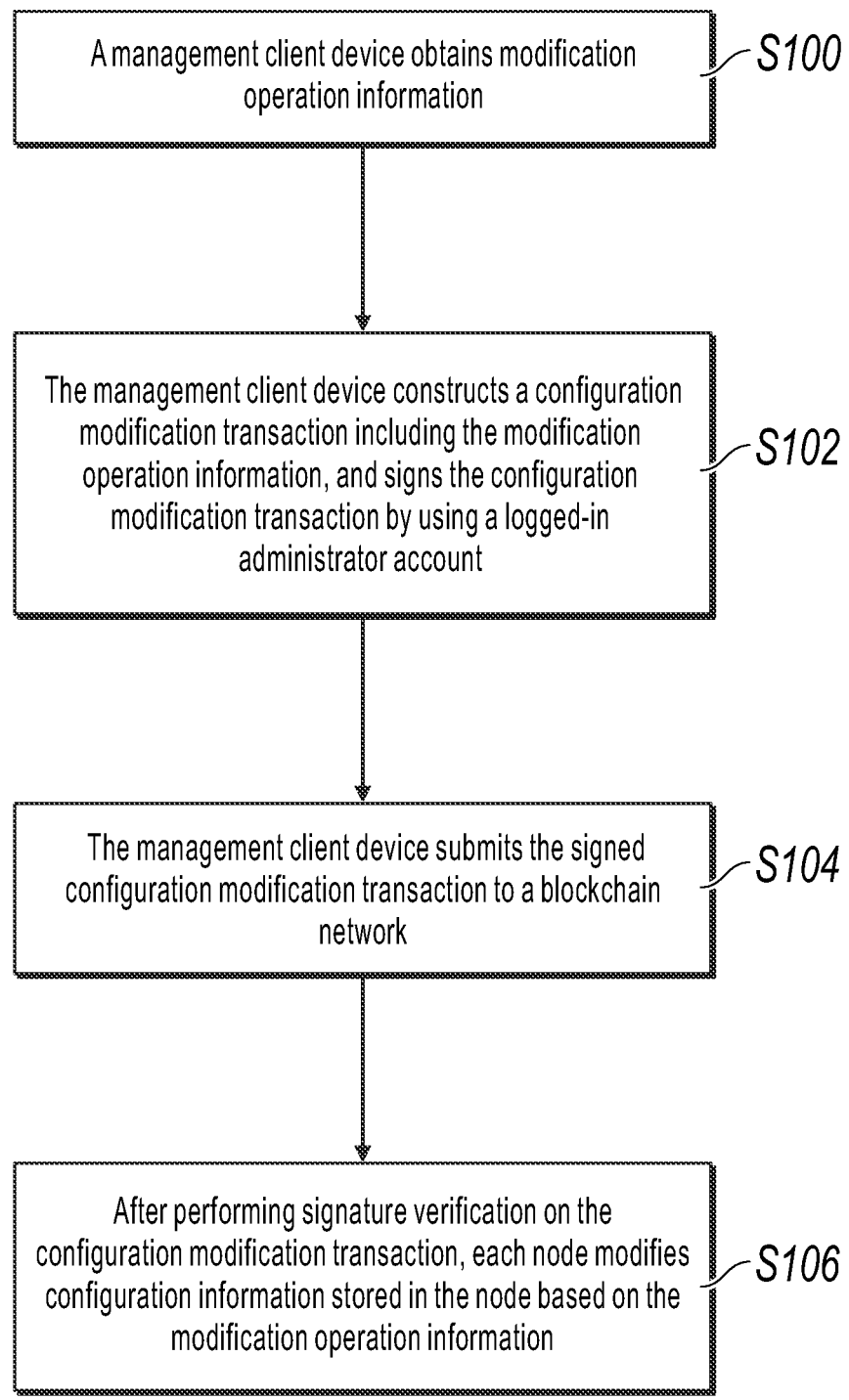
FIG. 1 is a schematic flowchart illustrating a method for modifying a blockchain network configuration, according to some embodiments of the present specification.

FIG. 1 is a schematic flowchart illustrating a method for modifying a blockchain network configuration, according to some embodiments of the present specification. The method includes the following steps:

S100. A management client device obtains modification operation information.

In some embodiments of the present specification, a user account (also referred to as a blockchain account) of a blockchain network can include at least one administrator account. The administrator account has permission to initiate a configuration modification transaction for modifying configuration information of the blockchain network. The administrator account is usually controlled by an administrator (or operation and maintenance personnel) of the blockchain network.

It is worthwhile to note that the configuration information of the blockchain network described in the present specification can refer to any information related to the configuration of the blockchain network in a broad sense, and can include not only running parameters of the blockchain network, but also other configurable information related to the blockchain network (such as a node, a smart contract, and a user account).

It should also be noted that the "modification" described here is used both in a broad sense and a narrow sense. In a broad sense, modifying a configuration of a blockchain network can be understood as updating the configuration of the blockchain network, for example, deleting or adding a node is also modifying the configuration of the blockchain network. In a narrow sense, modifying a configuration of a blockchain network can refer to modifying a certain running parameter, modifying a network address of a certain node, etc.

The management client device in step S100 is a blockchain client device that an administrator account is logged in. When more than one administrator account exists, the management client device can be a blockchain client device that any administrator account is logged in.

In step S100, the modification operation information obtained by the management client device can be entered by an administrator that controls the administrator account logged in to the management client device. For example, the administrator can enter the modification operation information to the management client device by using a command-line tool.

Further, in step S100, the management client device can display a human-machine interaction interface. The human-machine interaction interface has a function of displaying configuration information of the blockchain network. As such, the management client device can monitor, by using the human-machine interaction interface, a modification operation performed by a user (generally an administrator) on configuration information displayed on the human-machine interaction interface, and obtain modification operation information based on the monitored modification operation. That is, the modification operation performed by the user on the configuration information displayed in the human-machine interaction interface is actually delivering a modification instruction for the configuration information displayed in the human-machine interaction interface, so the management client device determines, based on the modification instruction delivered by the user, the modification operation information used to instruct the node to automatically modify the configuration.

This method is visualized for the administrator, and the operation is more intuitive and convenient. The administrator does not need to open the command-line tool in the management client device and use cumbersome and abstract command prompts (cmd.exe) to describe the modification operation information.

FIG. 2a to FIG. 2g are schematic diagrams illustrating a human-machine interaction interface, according to some embodiments of the present specification. It is worthwhile to note that FIG. 2a to FIG. 2g do not constitute a limitation on the embodiments of the present specification. In fact, any interface that can display configuration information of a blockchain network and allows an administrator to modify the displayed configuration information in an intuitive method belongs to the human-machine interaction interface described in the present specification.

Figure 2A:
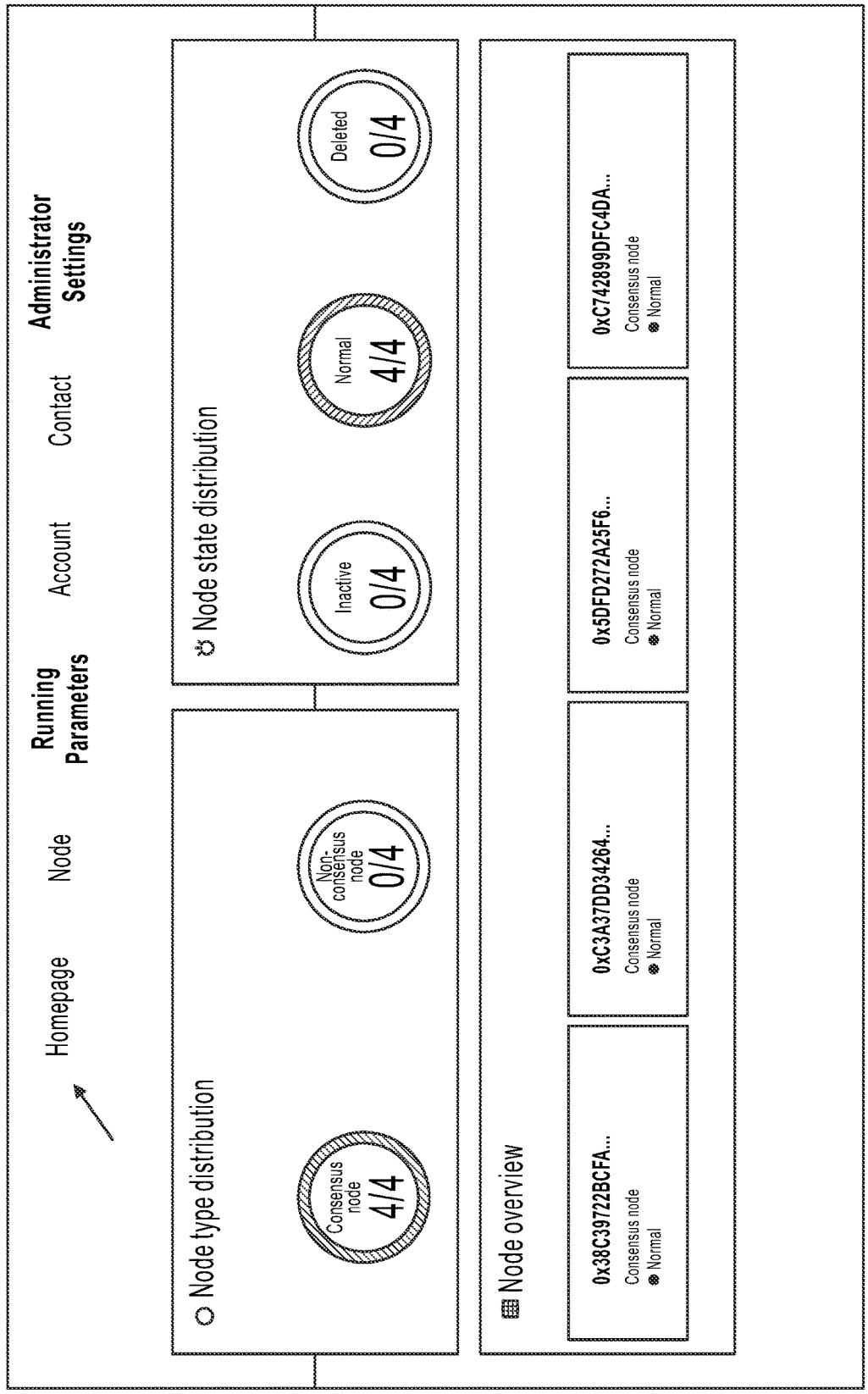
FIG. 2a to FIG. 2n are schematic diagrams illustrating a human-machine interaction interface, according to some embodiments of the present specification.

As shown in FIG. 2a, after a user logs in to an administrator account of the user on a management client device, a human-machine interaction interface displayed on the management client device is shown in the figure. In the human-machine interaction interface, the home page is opened by default. The home page displays a node profile of a consortium blockchain network.

Specifically, the home page displays node type distribution and node state distribution of the blockchain network in a pie chart, and the user can intuitively understand the overview information of nodes. As shown in FIG. 2a, there are four nodes in the consortium blockchain network, all of which are in a normal state and all of which are consensus nodes.

Figure 2B:
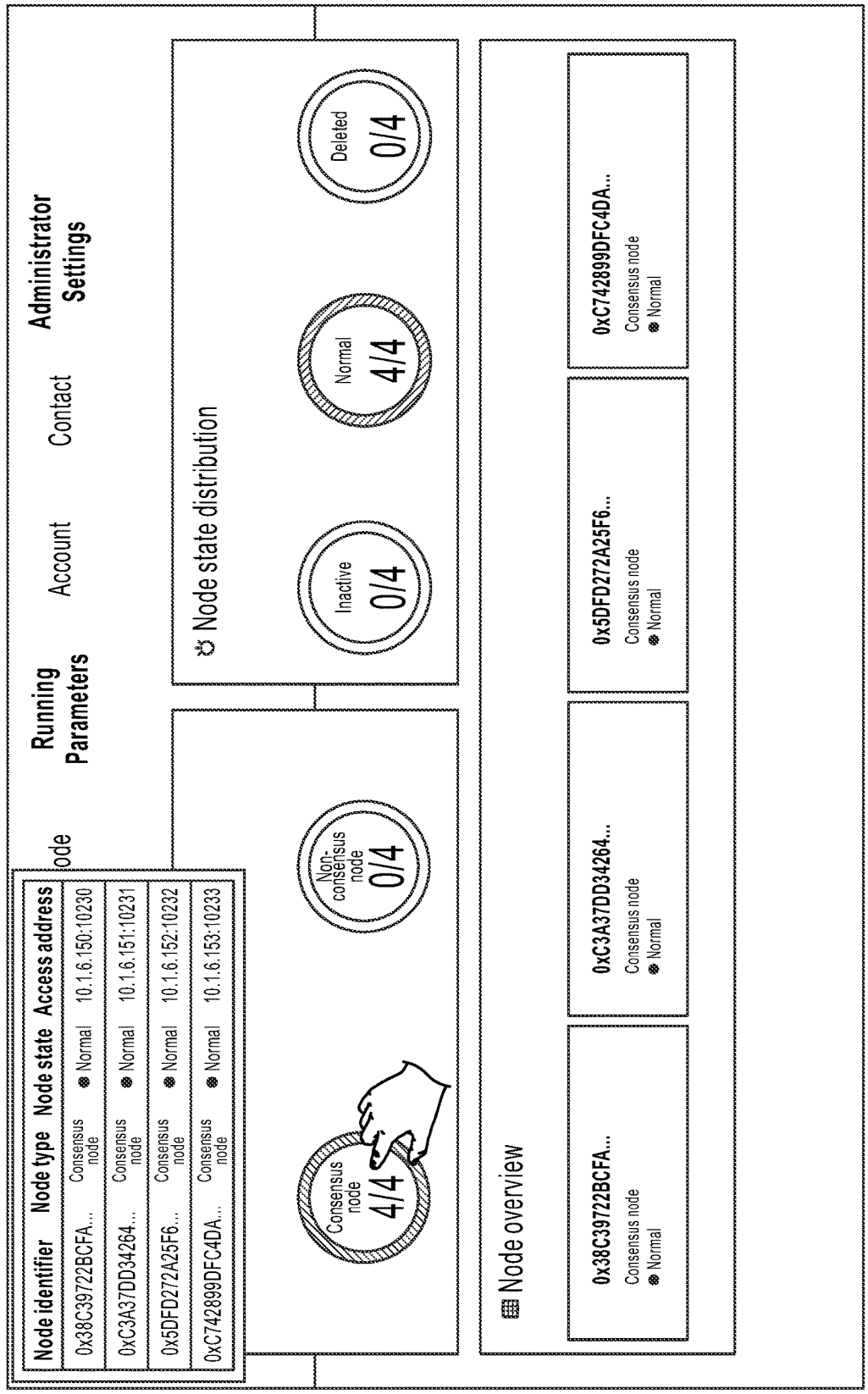

As shown in FIG. 2b, when a user moves a finger (or a mouse) onto a pie chart for displaying node type distribution, detailed information of each consensus node can be triggered for displaying.

Figure 2C:
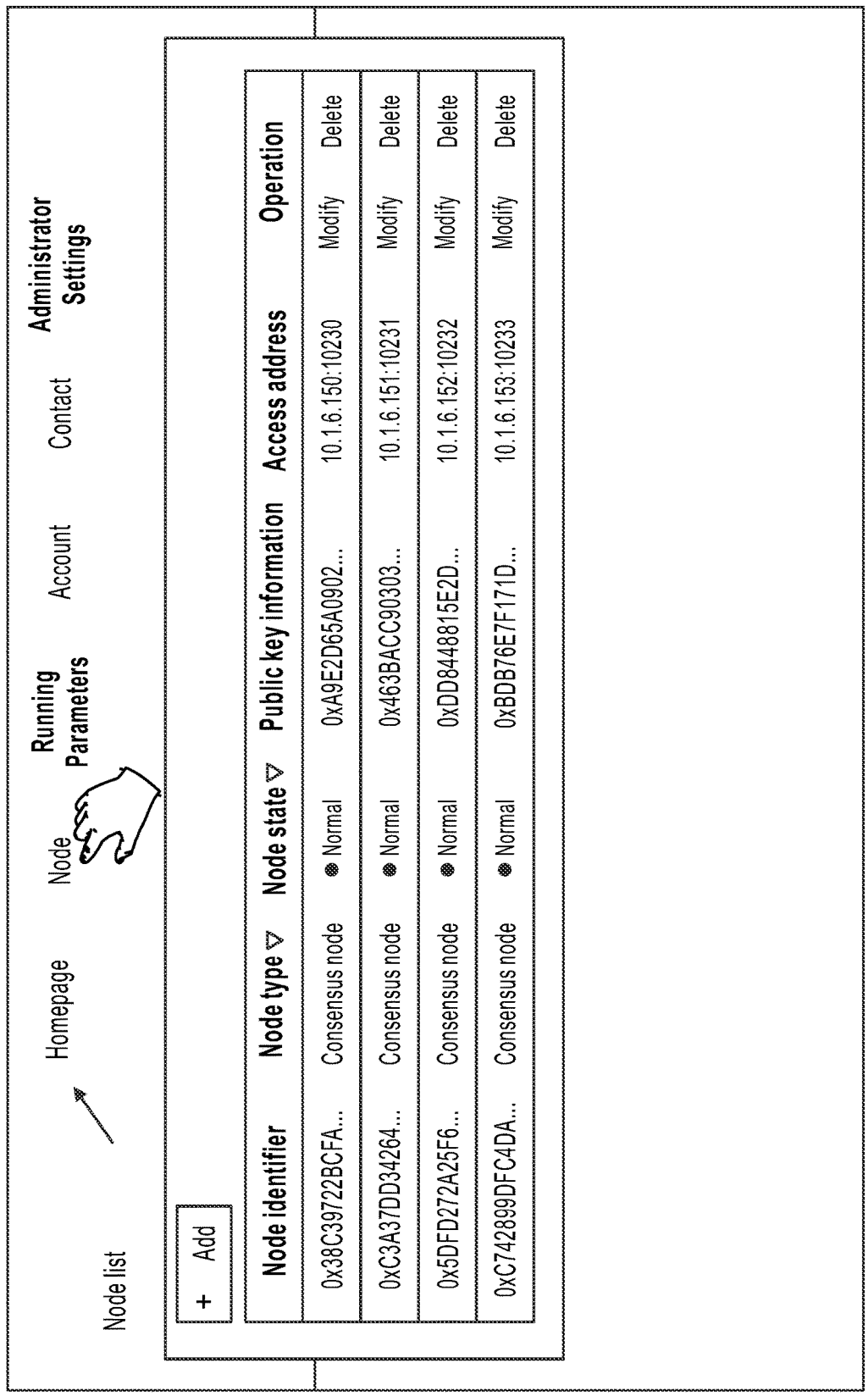
Figure 2D:
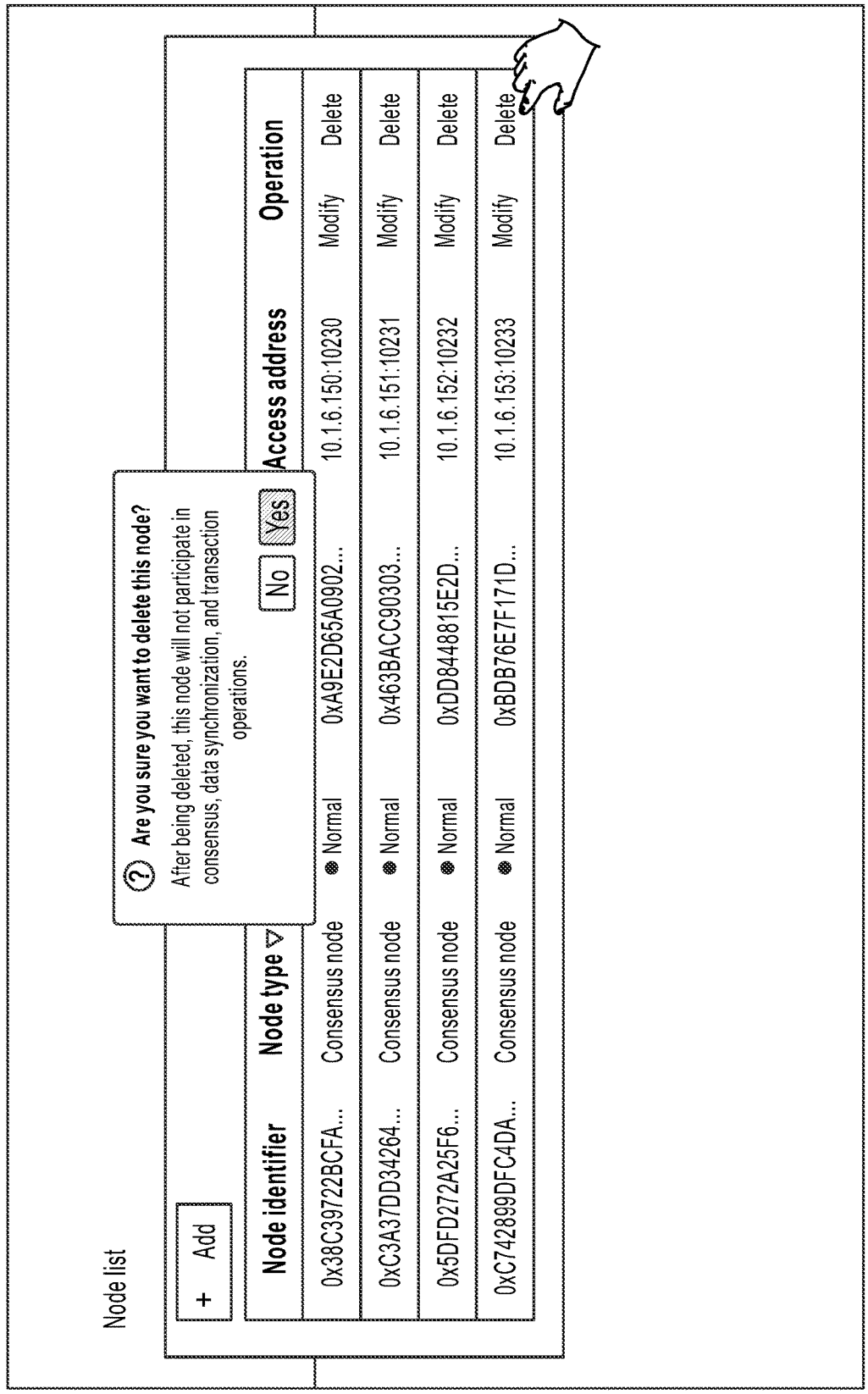
Figure 2E:
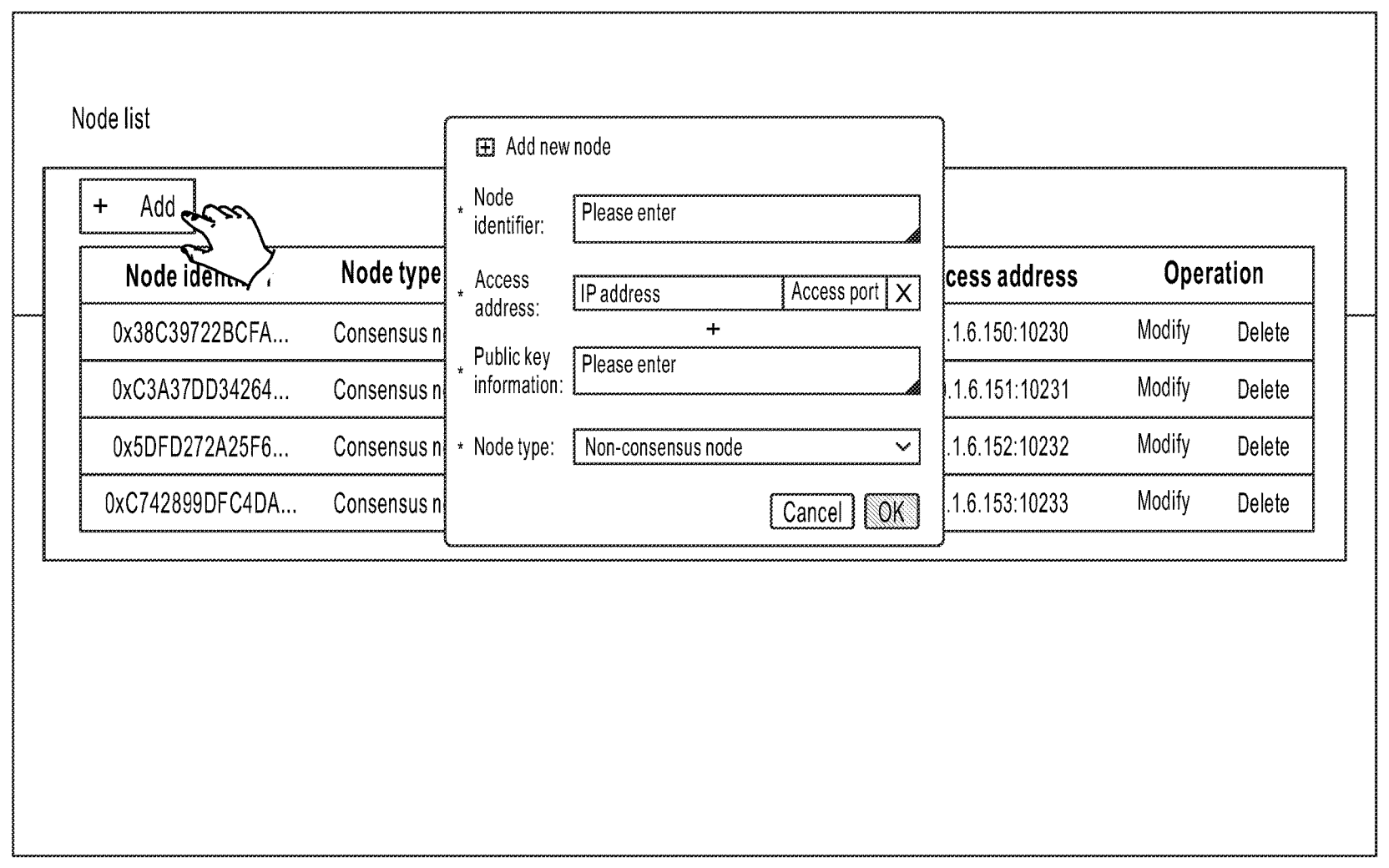
Figure 2F:
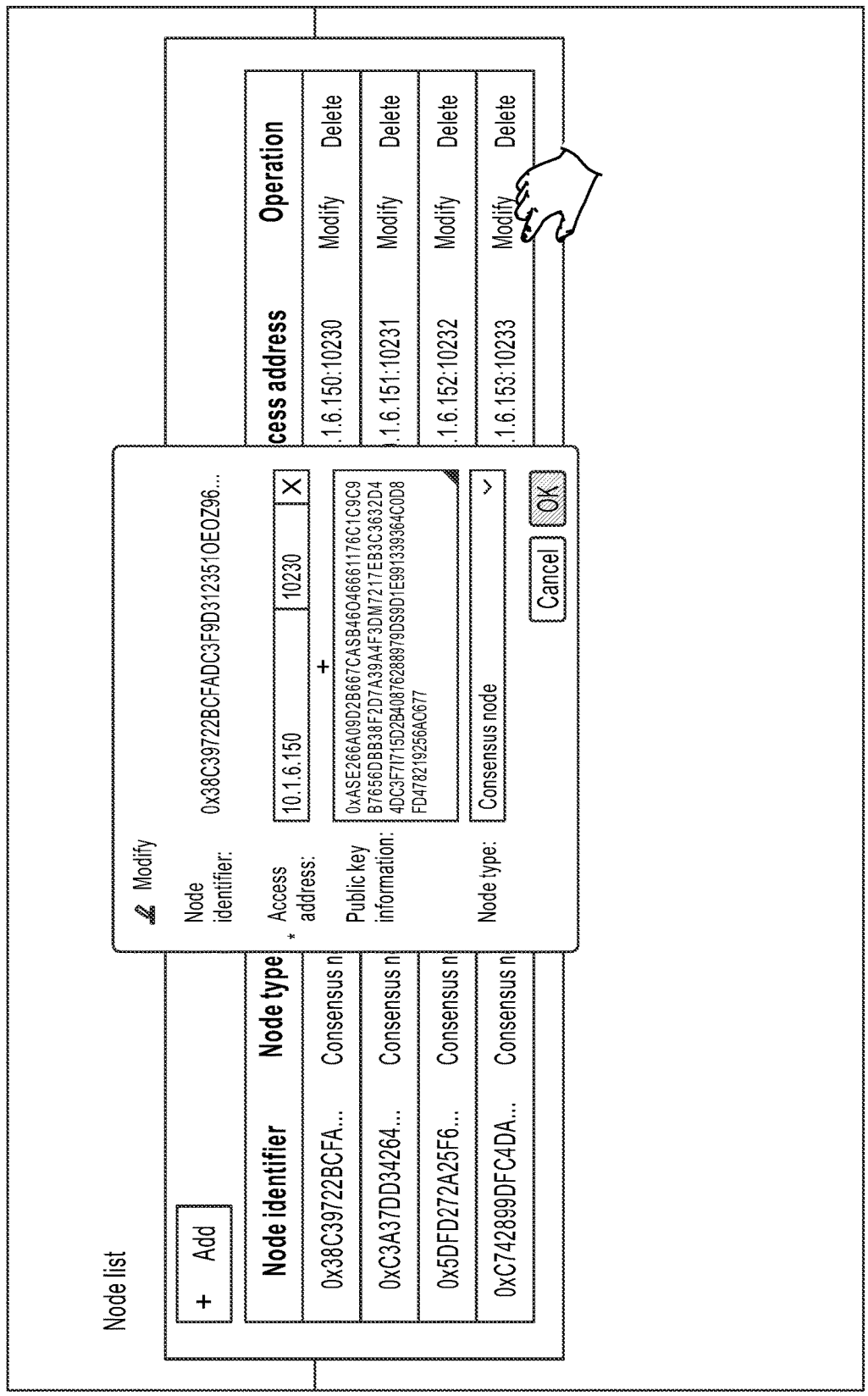
Figure 2G:
Figure 2H:
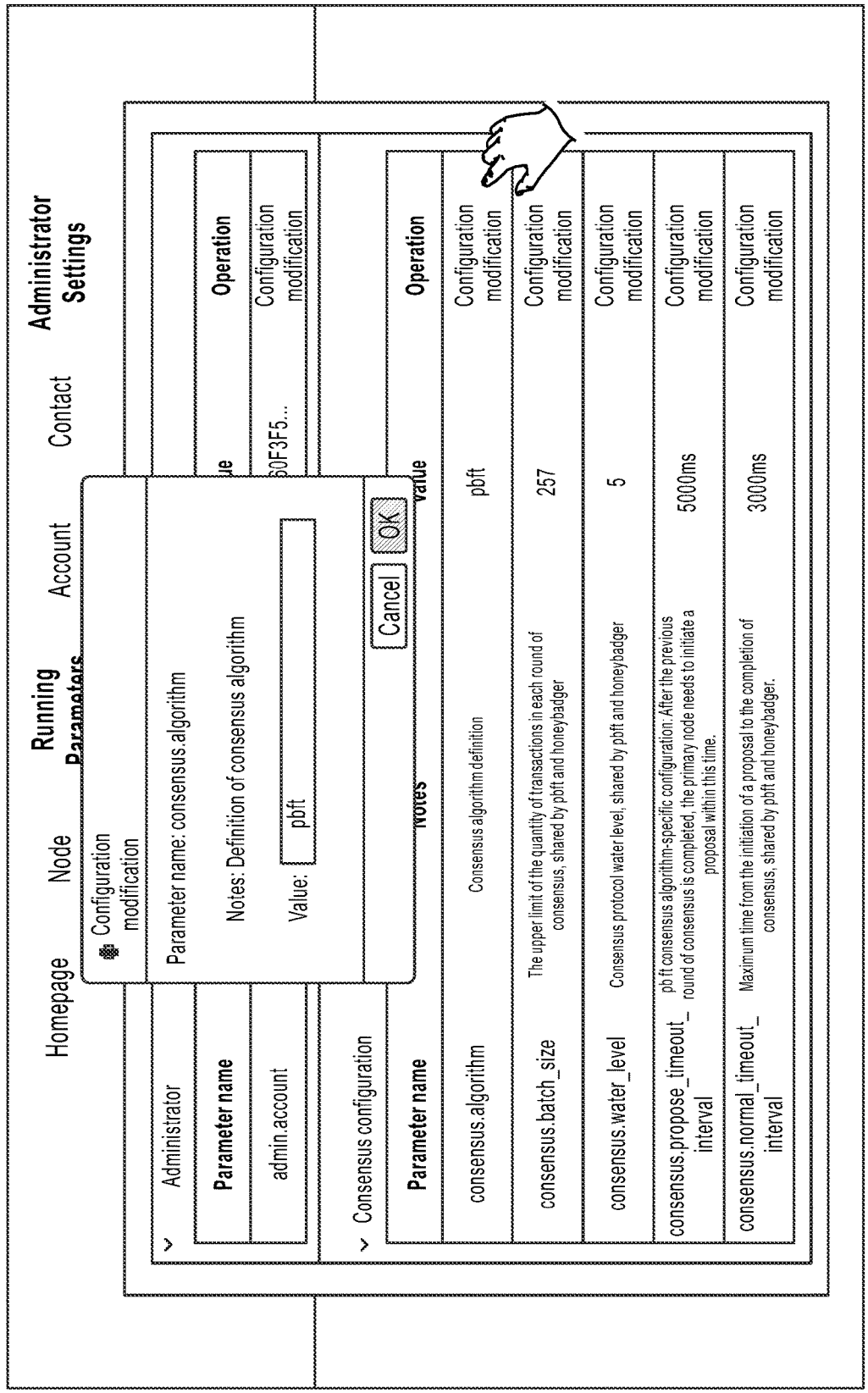

As shown in FIG. 2c, the user can trigger the human-machine interaction interface to switch to display a node list. In addition, the user can directly deliver a node deletion instruction, a node addition instruction, and a node modification instruction in the node list. For details, refer to FIG. 2d to FIG. 2f.

As shown in FIG. 2g to FIG. 2k, the user can trigger the human-machine interaction interface to switch to display a running parameter list of the blockchain network. The user can directly deliver a modification instruction to each running parameter in the running parameter list. Configuring running parameters can include the following aspects: configuring administrator account parameters, configuring consensus protocol parameters (consensus configuration), configuring blockchain parameters (chain configuration), configuring Nonce values, configuring peer to peer (P2P) network layer parameters, configuring database parameters, configuring user account parameters (account configuration), configuring smart contract parameters, and other configurations. It is worthwhile to note that a schematic interface diagram obtained by stitching FIG. 2g to FIG. 2k in sequential order is a schematic diagram of the human-machine interaction interface after the user triggers the human-machine interaction interface to display the running parameter list.

Figure 2L:

As shown in FIG. 2l, the user can trigger the human-machine interaction interface to switch to display an account list (that is, a user account list, also referred to as a blockchain account list). In addition, the user can choose to deliver a freeze instruction or an unfreeze instruction directly for a certain user account in the account list.

Figure 2M:

As shown in FIG. 2m, the user can trigger the human-machine interaction interface to switch to display a contract list. In addition, the user can directly deliver a freeze instruction or an unfreeze instruction to a certain smart contract in the contract list.

Figure 2N:
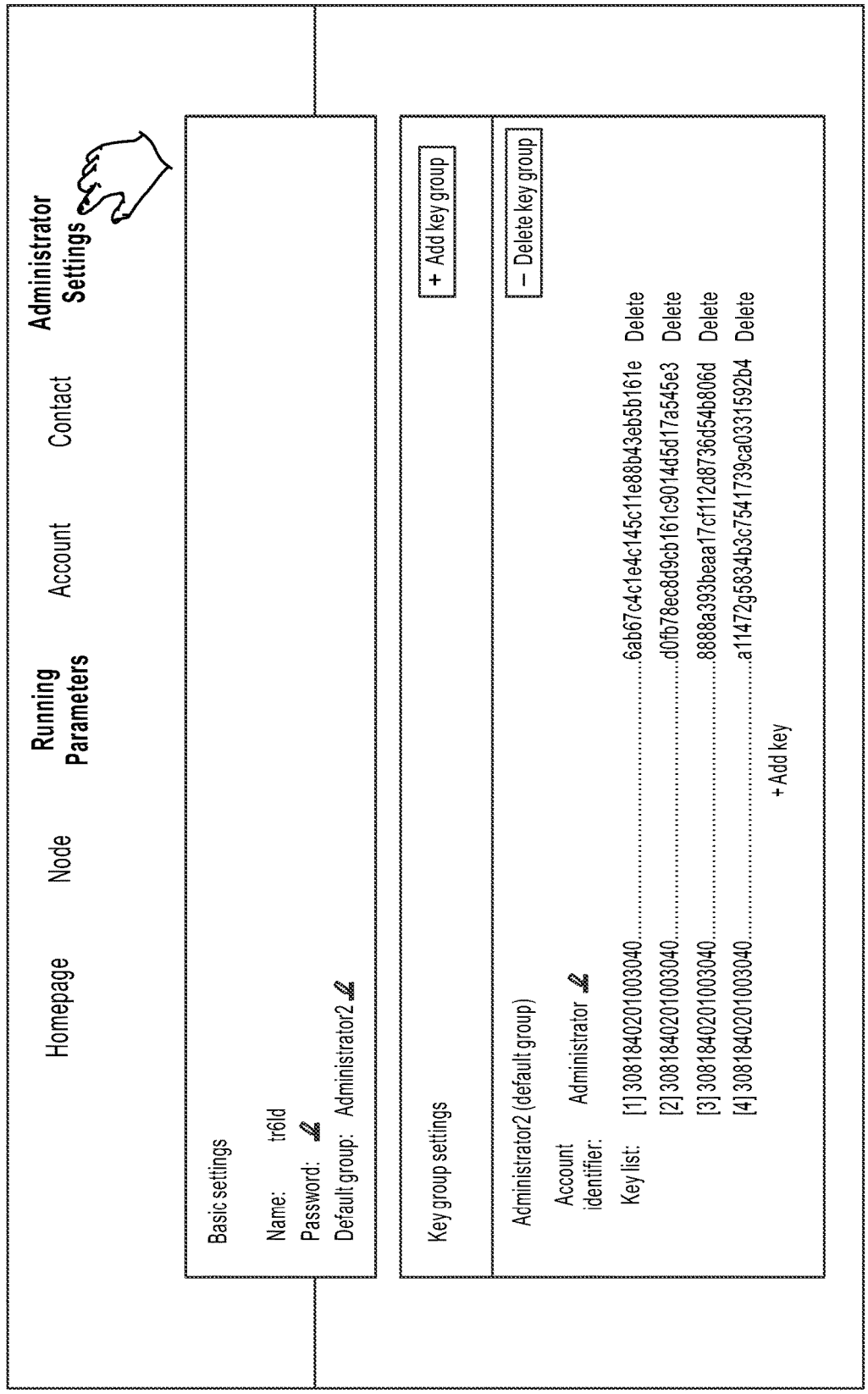

As shown in FIG. 2n, the user can select "Administrator Settings" in the human-machine interaction interface to trigger the human-machine interaction interface to switch to display a key group of an administrator account currently logged in, and the user can deliver a key group adding instruction or a key group deleting instruction by using the human-machine interaction interface. As shown in FIG. 2n, "trial" is an identifier of the administrator account currently logged in. "Default group" refers to the key group used by the administrator account currently logged in by default. In the embodiments of the present specification, one or more administrator accounts that have configuration modification permission exist in the user account of the blockchain network. Therefore, a key group of the administrator account also belongs to the configuration information of the blockchain network.

S102. The management client device constructs a configuration modification transaction including the modification operation information, and signs the configuration modification transaction by using the logged-in administrator account.

S104. The management client device submits the signed configuration modification transaction to the blockchain network.

S106. After performing signature verification on the configuration modification transaction, each node in the blockchain network modifies, based on the modification operation information included in the configuration modification transaction, blockchain network configuration information stored in the node, and writes the configuration modification transaction into the blockchain.

After obtaining the modification operation information, the management client device needs to transfer the obtained modification operation information to each node in the blockchain network, and each node needs to automatically modify the configuration information stored in the node based on the received modification operation information, so as to execute the configuration modification instruction delivered by the administrator.

For this reason, in the embodiments of the present specification, a smart contract including execution of configuration modification logic can be deployed in the blockchain network. When the blockchain network configuration needs to be modified, modification operation information can be encapsulated into a configuration modification transaction. When receiving the configuration modification transaction, each node in the blockchain network can invoke the configuration modification logic in the smart contract to modify the configuration on the node based on the configuration modification logic and the modification operation information in the configuration modification transaction.

In practice, not every user account has permission to modify the blockchain network configuration. Generally, several accounts with configuration modification permission are specified in the user accounts as administrator accounts. Only the administrator accounts have permission to construct and submit a configuration modification transaction.

Therefore, the administrator account also needs to sign the submitted configuration modification transaction to indicate that the configuration modification transaction is submitted by an administrator account with configuration modification permission.

In the embodiments of the present specification, when executing the configuration modification transaction, each node in the blockchain network needs to perform signature verification on the configuration modification transaction. If signature verification succeeds, the configuration modification transaction is executed.

If signature authorization of only a single administrator account is required to modify the blockchain network configuration, in step S102, the administrator account that initiates the configuration modification transaction can sign the configuration modification transaction to complete authorization. Accordingly, in step S106, each node performs signature verification on the configuration modification transaction, which is, in fact, validating an authenticity of the signature on the configuration modification transaction. If the signature is true (i.e., from the administrator account in step S102), it is determined that the configuration modification transaction passes signature verification.

In addition, it can also be stipulated that the authorization requires more than one administrator account to modify the blockchain network configuration. In this case, not only the administrator account that initiates the configuration modification transaction needs to authorize the configuration modification transaction, but also at least one another administrator account needs to authorize the configuration modification transaction.

The present specification provides two methods for collecting signature authorization for the configuration modification transaction.

Method 1:

An administrator account that initiates a configuration modification transaction can obtain a key of at least one another administrator account in advance. For example, a controller of the administrator account can privately negotiate with a controller of another administrator account to obtain a key of the another administrator account. Assuming that at least three administrators are required to sign and authorize the configuration modification transaction, the administrator account needs to obtain keys of two other administrator accounts.

As such, before submitting the signed configuration modification transaction to the blockchain network, the management client device can sign the configuration modification transaction by using a key of at least one another administrator account than the logged-in administrator account.

In method 1, the administrator account that initiates the configuration modification transaction needs to hold a key of another administrator account in advance.

Method 2:

Or, an administrator account that initiates a configuration modification transaction does not need to hold a key of another administrator account. After the administrator account that initiates the configuration modification transaction signs the configuration modification transaction and submits it to a blockchain network, another administrator account obtains the configuration modification transaction from the blockchain network to perform signature authorization.

Specifically, before each node performs signature verification on the configuration modification transaction, at least one another management client device can obtain the configuration modification transaction from the blockchain network, where the another management client device is a blockchain client device that another administrator account is logged in. The at least one another management client device then signs the configuration modification transaction by using the logged-in another administrator account, and submits the signed configuration modification transaction to the blockchain network.

If an authorization requires more than one administrator account to modify the blockchain network configuration, signature verification performed on the configuration modification transaction by each node can be validating authenticity of each signature on the configuration modification transaction. If authenticity of a specified quantity of signatures is validated, it is determined that the configuration modification transaction passes signature verification.

In addition, signature verification on the configuration modification transaction can also be implemented in the following method:

Assign a weight to each administrator account in advance. When signature verification is performed on a configuration modification transaction, it can be determined, for each signature corresponding to the configuration modification transaction, whether the authenticity of signature is validated; if the authenticity of signature is validated, obtain a weight corresponding to an administrator account that generates the signature as a weight corresponding to the signature; sum weights individually corresponding to all signatures that passed the authenticity validation; if the obtained weight sum is greater than a predetermined weight, determine that the configuration modification transaction passes signature verification; or if the obtained weight sum is not greater than the predetermined weight, determine that the configuration modification transaction does not pass signature verification.

For example, there are four administrator accounts (administrator accounts A to D) in user accounts of a blockchain network. A weight of administrator account A is 2, a weight of administrator account B is 5, a weight of administrator account C is 4, a weight of administrator account C is 8, and a predetermined weight for a configuration modification transaction to pass signature verification is 10. Assuming that administrator account A initiates a configuration modification transaction, and can only collect a signature of administrator account B. Then, only a signature of administrator A and the signature of administrator B exist on the configuration modification transaction. The weight sum is 7 and is less than the predetermined weight 10. Therefore, signature verification fails, and administrator account A cannot configure the blockchain network.

In addition, in the embodiments of the present specification, the configuration modification transaction is further written into the blockchain. As such, each blockchain network configuration can be recorded in the blockchain, and is traceable and difficult to tamper with.

Figure 3:
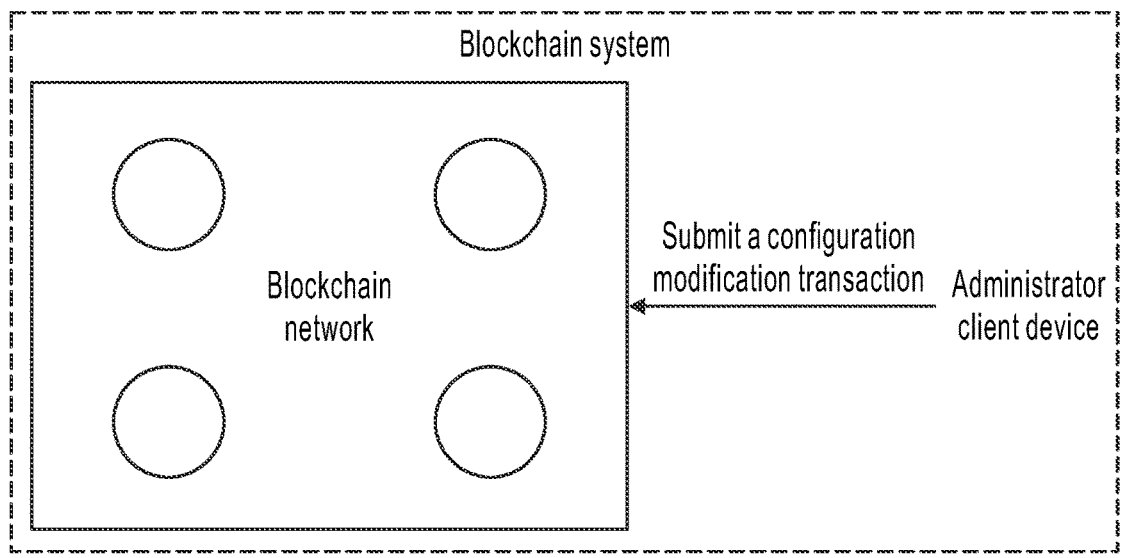
FIG. 3 is a schematic structural diagram illustrating a blockchain system, according to some embodiments of the present specification.

FIG. 3 is a schematic structural diagram illustrating a blockchain system, according to some embodiments of the present specification. The blockchain system includes at least one blockchain client device and a blockchain network, where a user account of the blockchain network includes at least one administrator account, and the management client device is a blockchain client device that an administrator account is logged in;

the management client device obtains modification operation information;

constructs a configuration modification transaction including the modification operation information, and signs the configuration modification transaction by using a key of the logged-in administrator account; and submits the configuration modification transaction to the blockchain network; and after performing signature verification on the configuration modification transaction, each node in the blockchain network modifies, based on the modification operation information included in the configuration modification transaction, blockchain network configuration information stored in the node, and writes the configuration modification transaction into the blockchain.

Figures 4, 5:
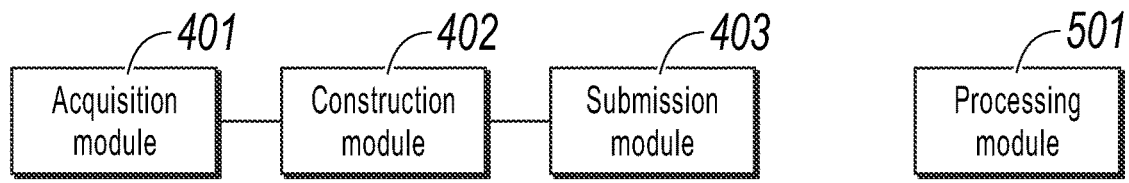
FIG. 4 is a schematic structural diagram illustrating an apparatus for modifying a blockchain network configuration, according to some embodiments of the present specification.
FIG. 5 is a schematic structural diagram illustrating an apparatus for modifying a blockchain network configuration, according to some embodiments of the present specification.

FIG. 4 is a schematic structural diagram illustrating an apparatus for modifying a blockchain network configuration, according to some embodiments of the present specification. A user account of a blockchain network includes at least one administrator account, and the apparatus includes:

an acquisition module 401, configured to obtain modification operation information, where the management client device is a blockchain client device on which the administrator account is logged in;

a construction module 402, configured to: construct a configuration modification transaction including the modification operation information, and sign the configuration modification transaction by using the logged-in administrator account; and a submission module 403, configured to submit the signed configuration modification transaction to the blockchain network, so after performing signature verification on the configuration modification transaction, each node in the blockchain network modifies, based on the modification operation information included in the configuration modification transaction, blockchain network configuration information stored in the node, and writes the configuration modification transaction into the blockchain.

FIG. 5 is a schematic structural diagram illustrating an apparatus for modifying a blockchain network configuration, according to some embodiments of the present specification. A user account of a blockchain network includes at least one administrator account, the blockchain network includes a plurality of apparatuses, and the apparatus includes:

a processing module 501, configured to: after performing signature verification on a configuration modification transaction, perform a configuration operation on the node based on modification operation information included in the configuration modification transaction, and write the configuration modification transaction into the blockchain;

where the configuration modification transaction is constructed and submitted to the blockchain network by a management client device after obtaining the modification operation information, the management client device is a blockchain client device that an administrator account is logged in, and the management client device has signed the configuration modification transaction by using the logged-in administrator account.

some embodiments of the present specification further provide a computer device. The computer device includes at least a memory, a processor, and a computer program that is stored in the memory and that can run on the processor. When executing the program, the processor implements the functions of the method in FIG. 1.

Figure 6:
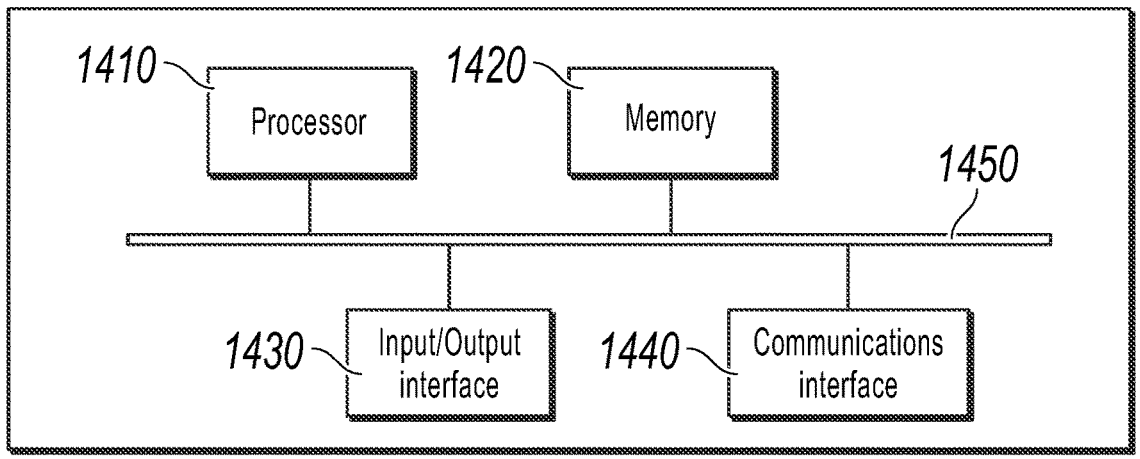
FIG. 6 is a schematic structural diagram illustrating a computer device used to configure an apparatus in some embodiments of the present specification.

FIG. 6 is a more detailed schematic diagram illustrating a hardware structure of a computing device, according to some embodiments of the present specification. The device can include a processor 1410, a memory 1420, an input/output interface 1430, a communications interface 1440, and a bus 1450. The processor 1410, the memory 1420, the input/output interface 1430, and the communications interface 1440 are communicatively connected to each other inside the device by using the bus 1450.

The processor 1410 can be implemented by using a general central processing unit (CPU), a microprocessor, an application-specific integrated circuit (ASIC), one or more integrated circuits, etc., and is configured to execute a related program, so as to implement the technical solutions provided in the embodiments of the present specification.

The memory 1420 can be implemented by using a read-only memory (ROM), a random access memory (RAM), a static storage device, a dynamic storage device, etc. The memory 1420 can store an operating system and another application program. When the technical solutions provided in the embodiments of the present specification are implemented by using software or firmware, related program code is stored in the memory 1420, and is invoked and executed by the processor 1410.

The input/output interface 1430 is configured to be connected to an input/output module, to input or output information. The input/output module (not shown in the figure) can be used as a component and configured in the device, or can be externally connected to the device, to provide a corresponding function. The input module can include a keyboard, a mouse device, a touchscreen, a microphone, various sensors, etc. The output module can include a monitor, a speaker, a vibrator, an indicator, etc.

The communications interface 1440 is configured to be connected to a communications module (not shown in the figure), to implement a communication interaction between the device and another device. The communications module can perform communication in a wired way (for example, USB or a network cable), or can perform communication in a wireless way (for example, a mobile network, Wi-Fi, or Bluetooth).

The bus 1450 includes one channel, used to transmit information between components (for example, the processor 1410, the memory 1420, the input/output interface 1430, and the communications interface 1440) of the device.

It is worthwhile to note that although only the processor 1410, the memory 1420, the input/output interface 1430, the communications interface 1440, and the bus 1450 of the device are shown, during specific implementation, the device can further include other components needed for implementing normal running. In addition, a person skilled in the art can understand that the device can include only components necessary for implementing the solutions in the embodiments of the present specification, but does not necessarily include all components shown in the figure.

some embodiments of the present specification further provide a computer readable storage medium. The computer readable storage medium stores a computer program. When executing the program, a processor implements the functions of the method in FIG. 1.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. As described in the present application, the computer readable medium does not include computer readable transitory media such as a modulated data signal and a carrier.

It can be understood from the previous descriptions of the implementations that, a person skilled in the art can clearly understand that the embodiments of the present specification can be implemented by using software and a necessary general hardware platform. Based on such an understanding, the technical solutions in the embodiments of the present specification essentially or the part contributing to the existing technology can be implemented in a form of a software product. The computer software product can be stored in a storage medium, such as a ROM/RAM, a magnetic disk, or an optical disc, and includes several instructions for instructing a computer device (which can be a personal computer, a server, a network device, etc.) to perform the method described in the embodiments of the present specification or in some parts of the embodiments of the present specification.

The system, method, module, or unit illustrated in the previous embodiments can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

The embodiments in the present specification are described in a progressive way. For same or similar parts of the embodiments, references can be made to the embodiments. Each embodiment focuses on a difference from other embodiments. Particularly, a device embodiment is similar to a method embodiment, and therefore is described briefly. For a related part, references can be made to some descriptions in the method embodiment. The previously described apparatus embodiments are merely examples. The modules described as separate parts can or cannot be physically separate. During implementation of the solutions in the embodiments of the present application, functions of the modules can be implemented in one or more pieces of software and/or hardware. Some or all of the modules can be selected based on an actual need to implement the solutions of the embodiments. A person of ordinary skill in the art can understand and implement the embodiments of the present application without creative efforts.

The previous descriptions are merely specific implementations of the embodiments of the present application. It is worthwhile to note that a person of ordinary skill in the art can further make several improvements or polishing without departing from the principle of the embodiments of the present application, and the improvements or polishing shall fall within the protection scope of the embodiments of the present application.

What is claimed is:

1. A computer-implemented method for blockchain network configuration modification, comprising:
    obtaining, by a management client device, modification operation information, wherein the management client device is a blockchain client device of a blockchain network on which an administrator account is logged in as a logged-in administrator account, and wherein a user account of the blockchain network comprises at least two administrator accounts;
    constructing, by the management client device, a configuration modification transaction comprising the modification operation information;
    signing, by at least one another management client device, the configuration modification transaction by using a logged-in another administrator account, wherein the at least one another management client device is a client device of the blockchain network on which another administrator account is logged in as the logged-in another administrator account; and
        submitting the signed configuration modification transaction to the blockchain network; and
    after performing signature verification on the configuration modification transaction:
        modifying, by each node in the blockchain network and based on the modification operation information comprised in the configuration modification transaction, blockchain network configuration information stored in the node; and
        writing the configuration modification transaction into the blockchain network.

2. The computer-implemented method of claim 1, wherein obtaining, by the management client device, the modification operation information comprises:
    displaying, by the management client device, a human-machine interaction interface, wherein the human-machine interaction interface has a function of displaying blockchain network configuration information; and
    monitoring, by the management client device by using the human-machine interaction interface and as a monitored modification operation, a modification operation performed by a user on configuration information displayed on the human-machine interaction interface, and obtaining the modification operation information based on the monitored modification operation.

3. The computer-implemented method of claim 1, further comprising:
    assigning a weight value to each of the at least two administrator accounts.

4. The computer-implemented method of claim 3, wherein:
    performing the signature verification on the configuration modification transaction comprises:
        determining, for each signature corresponding to the configuration modification transaction, whether an authenticity of each signature is validated;
        if the authenticity of each signature is validated, obtaining the weight value corresponding to a particular administrator account that generates the signature; and
        summing, as an obtained weight sum, weight values corresponding to all signatures that passed an authenticity validation.

5. The computer-implemented method of claim 4, further comprising:
    if the obtained weight sum is greater than a predetermined weight, determining that the signature verification of the configuration modification transaction is successful.

6. The computer-implemented method of claim 4, further comprising:
    if the obtained weight sum is not greater than a predetermined weight, determining that the signature verification of the configuration modification transaction is unsuccessful.

7. A non-transitory, computer-readable medium storing one or more instructions executable by a computer system to perform operations for blockchain network configuration modification, comprising:
    obtaining, by a management client device, modification operation information, wherein the management client device is a blockchain client device of a blockchain network on which an administrator account is logged in as a logged-in administrator account, and wherein a user account of the blockchain network comprises at least one administrator account;
    constructing, by the management client device, a configuration modification transaction comprising the modification operation information;
    signing, by at least one another management client device, the configuration modification transaction by using a logged-in another administrator account, wherein the at least one another management client device is a client device of the blockchain network on which another administrator account is logged in as the logged-in another administrator account; and
    submitting the signed configuration modification transaction to the blockchain network; and
    after performing signature verification on the configuration modification transaction:

modifying, by each node in the blockchain network based on the modification operation information comprised in the configuration modification transaction, blockchain network configuration information stored in the node; and writing the configuration modification transaction into the blockchain network.

8. The non-transitory, computer-readable medium of claim 7, wherein obtaining, by the management client device, the modification operation information comprises:

displaying, by the management client device, a human-machine interaction interface, wherein the human-machine interaction interface has a function of displaying blockchain network configuration information; and monitoring, by the management client device by using the human-machine interaction interface and as a monitored modification operation, a modification operation performed by a user on configuration information displayed on the human-machine interaction interface, and obtaining the modification operation information based on the monitored modification operation.

9. The non-transitory, computer-readable medium of claim 7, further comprising:

assigning a weight value to each of the at least two administrator accounts.

10. The non-transitory, computer-readable medium of claim 9, wherein:

performing the signature verification on the configuration modification transaction comprises:

determining, for each signature corresponding to the configuration modification transaction, whether an authenticity of each signature is validated;

if the authenticity of each signature is validated, obtaining the weight value corresponding to a particular administrator account that generates the signature; and summing, as an obtained weight sum, weight values corresponding to all signatures that passed an authenticity validation.

11. The non-transitory, computer-readable medium of claim 10, further comprising:

if the obtained weight sum is greater than a predetermined weight, determining that the signature verification of the configuration modification transaction is successful.

12. The non-transitory, computer-readable medium of claim 10, further comprising:

if the obtained weight sum is not greater than a predetermined weight, determining that the signature verification of the configuration modification transaction is unsuccessful.

13. A computer-implemented system for blockchain network configuration modification, comprising:

one or more computers; and one or more computer memory devices interoperably coupled with the one or more computers and having tangible, non-transitory, machine-readable media storing one or more instructions that, when executed by the one or more computers, cause the one or more computers to perform one or more operations comprising:

obtaining, by a management client device, modification operation information, wherein the management client device is a blockchain client device of a blockchain network on which an administrator account is logged in as a logged-in administrator account, and wherein a user account of the blockchain network comprises at least two administrator accounts;

constructing, by the management client device, a configuration modification transaction comprising the modification operation information;

signing, by at least one another management client device, the configuration modification transaction by using a logged-in another administrator account, wherein the at least one another management client device is a client device of the blockchain network on which another administrator account is logged in as the logged-in another administrator account; and submitting the signed configuration modification transaction to the blockchain network; and after performing signature verification on the configuration modification transaction:

modifying, by each node in the blockchain network based on the modification operation information comprised in the configuration modification transaction, blockchain network configuration information stored in the node; and writing the configuration modification transaction into the blockchain network.

14. The computer-implemented system of claim 13, wherein obtaining, by the management client device, the modification operation information comprises:

displaying, by the management client device, a human-machine interaction interface, wherein the human-machine interaction interface has a function of displaying blockchain network configuration information; and monitoring, by the management client device by using the human-machine interaction interface and as a monitored modification operation, a modification operation performed by a user on configuration information displayed on the human-machine interaction interface, and obtaining the modification operation information based on the monitored modification operation.

15. The computer-implemented system of claim 13, further comprising:

assigning a weight value to each of the at least two administrator accounts.

16. The computer-implemented system of claim 15, wherein:

performing the signature verification on the configuration modification transaction comprises:

determining, for each signature corresponding to the configuration modification transaction, whether an authenticity of each signature is validated;

if the authenticity of each signature is validated, obtaining the weight value corresponding to a particular administrator account that generates the signature; and summing, as an obtained weight sum, weight values corresponding to all signatures that passed an authenticity validation.

17. The computer-implemented system of claim 16, further comprising:

if the obtained weight sum is greater than a predetermined weight, determining that the signature verification of the configuration modification transaction is successful; or if the obtained weight sum is not greater than the predetermined weight, determining that the signature verification of the configuration modification transaction is unsuccessful.

\* \* \* \* \*

UNITED STATES PATENT AND TRADEMARK OFFICE
CERTIFICATE OF CORRECTION

PATENT NO. : 11,349,649 B2
APPLICATION NO. : 17/242697
DATED : May 31, 2022
INVENTOR(S) : Li et al.

It is certified that error appears in the above-identified patent and that said Letters Patent is hereby corrected as shown below:

In the Claims

Column 12, Line 53, in Claim 7, delete "one" and insert -- two --.

Column 12, Line 53, in Claim 7, delete "account;" and insert -- accounts; --.

Signed and Sealed this
Second Day of August, 2022

Katherine Kelly Vidal
*Director of the United States Patent and Trademark Office*